(12) United States Patent
Matsuo et al.

(10) Patent No.: US 12,071,344 B2
(45) Date of Patent: Aug. 27, 2024

(54) OPERATION METHOD FOR HYDROGEN PRODUCTION DEVICE, AND HYDROGEN PRODUCTION DEVICE

(71) Applicant: Osaka Gas Co., Ltd., Osaka (JP)

(72) Inventors: Hinako Matsuo, Osaka (JP); Hidaka Asonuma, Osaka (JP); Koichiro Ikeda, Osaka (JP)

(73) Assignee: Osaka Gas Co., Ltd., Osaka (JP)

( * ) Notice: Subject to any disclaimer, the term of this patent is extended or adjusted under 35 U.S.C. 154(b) by 529 days.

(21) Appl. No.: 17/440,466

(22) PCT Filed: Mar. 27, 2020

(86) PCT No.: PCT/JP2020/013969
§ 371 (c)(1),
(2) Date: Sep. 17, 2021

(87) PCT Pub. No.: WO2020/196823
PCT Pub. Date: Oct. 1, 2020

(65) Prior Publication Data
US 2022/0162065 A1   May 26, 2022

(30) Foreign Application Priority Data

Mar. 27, 2019  (JP) ................................ 2019-060429

(51) Int. Cl.
*C01B 3/38* (2006.01)
*B01D 53/047* (2006.01)
*C01B 3/56* (2006.01)

(52) U.S. Cl.
CPC .............. *C01B 3/38* (2013.01); *B01D 53/047* (2013.01); *C01B 3/56* (2013.01); *B01D 2256/16* (2013.01); *B01D 2257/102* (2013.01); *B01D 2257/502* (2013.01); *B01D 2257/504* (2013.01); *B01D 2257/7025* (2013.01); *B01D 2259/40007* (2013.01); *B01D 2259/40086* (2013.01); *C01B 2203/0233* (2013.01); *C01B 2203/042* (2013.01); *C01B 2203/0811* (2013.01); *C01B 2203/1614* (2013.01)

(58) Field of Classification Search
CPC ............ C01B 3/38; C01B 3/56; B01D 53/047
See application file for complete search history.

(56) References Cited

U.S. PATENT DOCUMENTS

| | | | |
|---|---|---|---|
| 2003/0009943 A1 | 1/2003 | Millet et al. | |
| 2008/0005963 A1 | 1/2008 | Wheat et al. | |
| 2008/0289255 A1* | 11/2008 | Wheat | C01B 3/382 48/197 R |

FOREIGN PATENT DOCUMENTS

| | | |
|---|---|---|
| JP | 2003531795 A | 10/2003 |
| JP | 2008524107 A | 7/2008 |
| JP | 2011230939 A | 11/2011 |
| JP | 2016675 A | 1/2016 |

\* cited by examiner

*Primary Examiner* — Yong L Chu
(74) *Attorney, Agent, or Firm* — The Webb Law Firm

(57) ABSTRACT

When a product gas producing operation is stopped, a purge operation is executed in which steam purge processing and product gas purge processing are sequentially performed. The steam purge is supplying, instead of a source gas, a product gas from a product gas tank to a reformer using a compressor, and supplying a reformed gas from a reforming processing unit to a plurality of adsorption towers, which perform a pressure swing adsorption operation, while the reformer is heated by a heating burner and steam is supplied to the reformer. The product gas purge is supplying the product gas from the product gas tank to the reformer using the compressor, and supplying the product gas from the reforming processing unit to the plurality of adsorption towers, which perform the pressure swing adsorption operation, while the supply of the steam is stopped and the heating of the reformer is maintained.

4 Claims, 9 Drawing Sheets

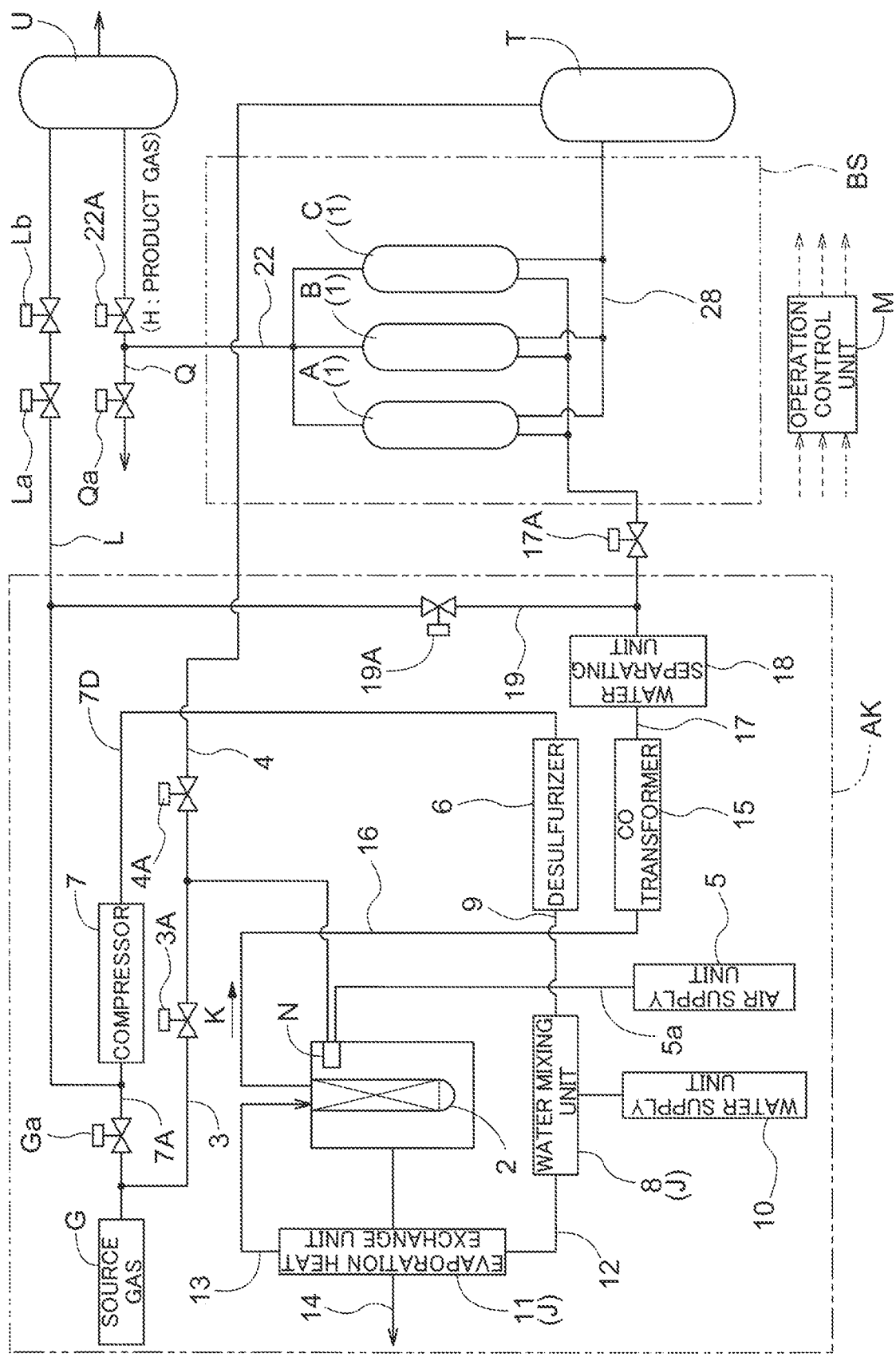

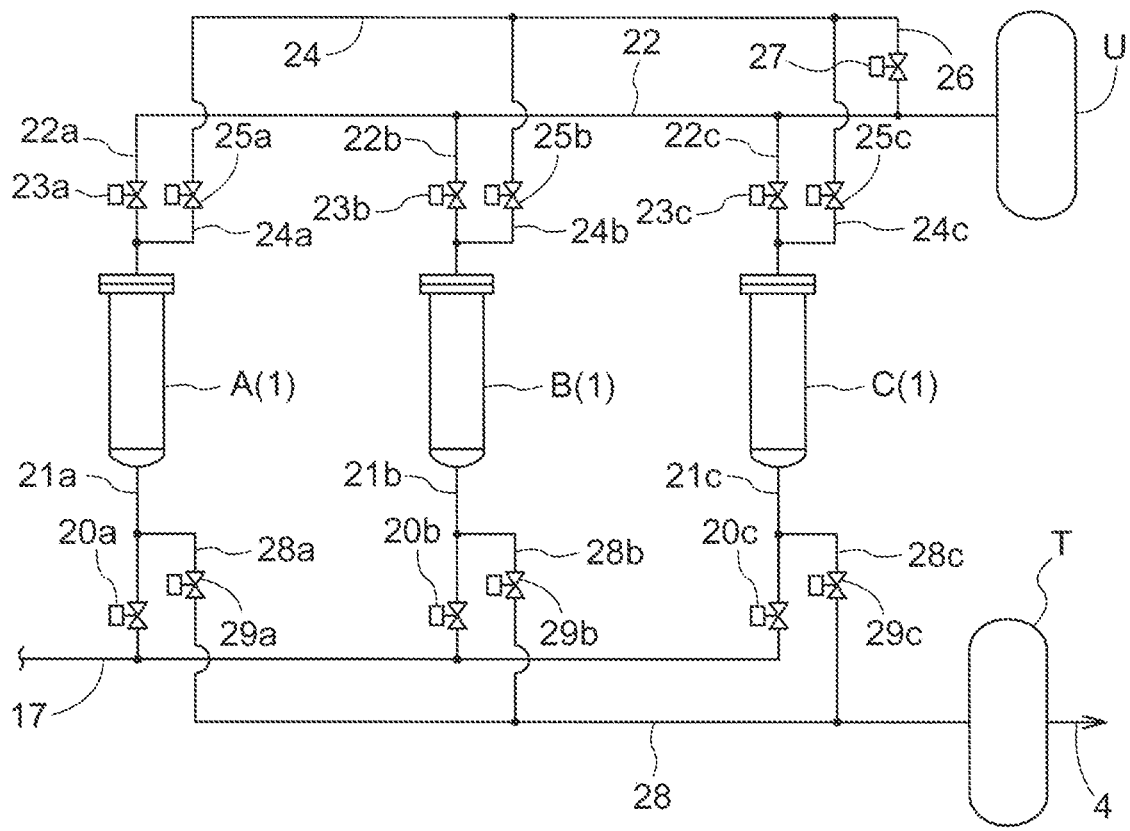

| | FIRST UNIT CYCLE | | | | SECOND UNIT CYCLE | | | | THIRD UNIT CYCLE | | | |
|---|---|---|---|---|---|---|---|---|---|---|---|---|
| FIRST ADSORPTION TOWER | ADSORPTION | | | | PRESSURE EQUALIZATION (DISCHARGE) | PRESSURE REDUCTION | | WASHING | PRESSURE EQUALIZATION (RECEPTION) | PRESSURE INCREASING | | |
| SECOND ADSORPTION TOWER | PRESSURE EQUALIZATION (RECEPTION) | PRESSURE INCREASING | | | ADSORPTION | | | | PRESSURE EQUALIZATION (DISCHARGE) | PRESSURE REDUCTION | | WASHING |
| THIRD ADSORPTION TOWER | PRESSURE EQUALIZATION (DISCHARGE) | PRESSURE REDUCTION | | WASHING | PRESSURE EQUALIZATION (RECEPTION) | PRESSURE INCREASING | | | ADSORPTION | | | |

OPERATION METHOD FOR HYDROGEN PRODUCTION DEVICE, AND HYDROGEN PRODUCTION DEVICE

CROSS-REFERENCE TO RELATED APPLICATIONS

This application is the United States national phase of International Application No. PCT/JP2020/013969 filed Mar. 27, 2020, and claims priority to Japanese Patent Application No. 2019-060429 filed Mar. 27, 2019, the disclosures of which are hereby incorporated by reference in their entirety.

BACKGROUND OF THE INVENTION

1. Field of the Invention

The present invention relates to an operation method for a hydrogen production device, the hydrogen production device including: a reforming processing unit provided with a compressor for source gas supply for supplying a source gas that contains a hydrogen component, and a reformer for performing steam reforming processing on the source gas in a state in which the reformer is heated to a reforming temperature by a heating burner to obtain a reformed gas that contains a large amount of hydrogen components; a pressure swing adsorption unit provided with a plurality of adsorption towers that perform a pressure swing adsorption operation of adsorbing, using an adsorbent, adsorption target components other than the hydrogen components from the reformed gas to produce a product gas, and discharging the adsorption target components as off-gas; a product gas tank that collects the product gas; and an off-gas supply path that supplies the off-gas as a burning fuel to the heating burner, the hydrogen production device being configured to execute a product gas producing operation of supplying the source gas and steam to the reformer to produce the reformed gas, and supplying the reformed gas from the reforming processing unit to the adsorption towers to produce the product gas. The present invention further relates to a hydrogen production device that includes an operation control unit that executes the product gas producing operation.

2. Description of Related Art

Such a hydrogen production device produces a product gas with a high hydrogen concentration in such a manner that a reforming unit reforms a source gas that is hydrocarbon gas such as natural gas or naphtha into a reformed gas having a large amount of hydrogen components in steam reforming processing, and a pressure swing adsorption unit adsorbs, from the reformed gas that contains the hydrogen components and adsorption target components other than the hydrogen components, the adsorption target components using an adsorbent.

Because off-gas that is discharged from the pressure swing adsorption unit contains a combustible component, it is typical that the off-gas that is discharged from the pressure swing adsorption unit is supplied to a heating burner for heating a reformer, and is burned.

Conventional examples of operation methods for this hydrogen production device include a method in which, when the product gas producing operation is stopped, a purge operation is executed in which steam purge processing and product gas purge processing are sequentially performed in a state in which a gas supply line from the reforming processing unit to the pressure swing adsorption unit is blocked. The steam purge processing is processing of supplying, instead of a source gas, a product gas from the product gas tank to the reformer using a compressor, and discarding the reformed gas from the reforming processing unit to the outside, while maintaining a state in which the reformer is heated by a heating burner and steam is supplied to the reformer. The product gas purge processing is processing of supplying the product gas from the product gas tank to the reformer using the compressor, and discarding the product gas from the reforming processing unit to the outside, in a state in which the supply of the steam is stopped and the heating of the reformer by the heating burner is maintained (See, for example, Patent Document 1).

Incidentally, Patent Document 1 discloses that after the above-described purge operation, a stand-by operation is performed in which the product gas from the reforming processing unit is circulated in the form of returning to the compressor through a return line, in a state in which the supply of the steam is stopped and the heating of the reformer by the heating burner is maintained, so as to stand by for the restart of the product gas producing operation.

Patent Document 1: JP 2016-675A

SUMMARY OF THE INVENTION

In conventional operation methods for a hydrogen production device, waste occurs such that a reformed gas is discarded to the outside in steam purge processing, and a product gas is discarded to the outside in product gas purge processing, and thus there is a demand for an improvement.

That is to say, although a reformed gas to be discarded to the outside in steam purge processing, and a product gas to be discarded to the outside in product gas purge processing contain a large amount of hydrogen components, the large amount of hydrogen components is discarded to the outside in a purge operation, and thus there is a demand for an improvement.

The present invention was made in view of the above-described circumstances, and an object thereof is to provide an operation method for a hydrogen production device that can prevent a large amount of hydrogen components from being discarded to the outside in a purge operation, and a hydrogen production device that executes this operation method.

According to the present invention, an operation method for a hydrogen production device is such that the hydrogen production device includes:

a reforming processing unit provided with a compressor for source gas supply for supplying a source gas that contains a hydrogen component, and a reformer for performing steam reforming processing on the source gas in a state in which the reformer is heated to a reforming temperature by a heating burner to obtain a reformed gas that contains a large amount of hydrogen components;

a pressure swing adsorption unit provided with a plurality of adsorption towers configured to perform a pressure swing adsorption operation of adsorbing, using an adsorbent, adsorption target components other than the hydrogen components from the reformed gas to produce a product gas, and discharging the adsorption target components as off-gas;

a product gas tank configured to collect the product gas; and an off-gas supply path configured to supply the off-gas as a burning fuel to the heating burner, the hydrogen production device being configured to execute a product gas producing operation of supplying the source gas and steam to the reformer to produce the reformed gas, and supplying the reformed gas from the reforming processing unit to the adsorption towers to produce the product gas, and the operation method of the present invention has a characteristic configuration in which when the product gas producing operation is stopped, a purge operation is executed in which steam purge processing and product gas purge processing are sequentially performed, the steam purge processing being processing of supplying, instead of the source gas, the product gas from the product gas tank to the reformer using the compressor, and supplying the reformed gas from the reforming processing unit to the plurality of adsorption towers, which perform the pressure swing adsorption operation, while maintaining a state in which the reformer is heated by the heating burner and the steam is supplied to the reformer, and the product gas purge processing being processing of supplying the product gas from the product gas tank to the reformer using the compressor, and supplying the product gas from the reforming processing unit to the plurality of adsorption towers, which perform the pressure swing adsorption operation, in a state in which the supply of the steam is stopped and the heating of the reformer by the heating burner is maintained.

That is to say, when the product gas producing operation is stopped, as the purge operation, the steam purge processing and the product gas purge processing are sequentially performed.

Also, since in the steam purge processing, instead of the source gas, the product gas from the product gas tank is supplied to the reformer using the compressor, and the reformed gas from the reforming processing unit is supplied to the plurality of adsorption towers, which perform the pressure swing adsorption operation, while maintaining a state in which the reformer is heated by the heating burner and steam is supplied to the reformer, gas having a high concentration in hydrogen components that is contained in the reformed gas from the reforming processing unit is collected as a product gas, and gas having a low concentration in hydrogen components (gas having a high concentration in adsorption target components) that is contained in the reformed gas from the reforming processing unit is supplied as off-gas to the heating burner, which heats the reformer, and is used as a burning fuel. This makes it possible to prevent the hydrogen components from being discarded to the outside in the steam purge processing.

Also, since in the product gas purge processing, the product gas from the product gas tank is supplied to the reformer using the compressor, and the product gas from the reforming processing unit is supplied to the plurality of adsorption towers, which perform the pressure swing adsorption operation, in a state in which the supply of the steam is stopped and the heating of the reformer by the heating burner is maintained, gas having a high concentration in hydrogen components that is contained in the product gas from the reforming processing unit is collected as a product gas, and gas having a low concentration in hydrogen components (gas having a high concentration in adsorption target components) that is contained in the product gas from the reforming processing unit is supplied as off-gas to the heating burner, which heats the reformer, and is used as a burning fuel. This makes it possible to prevent the hydrogen components from being discarded to the outside in the product gas purge processing.

In short, according to the characteristic configuration of the operation method for the hydrogen production device of the present invention, it is possible to prevent a large amount of hydrogen components from being discarded to the outside in the purge operation.

In a further characteristic configuration of the operation method for the hydrogen production device of the present invention, after the purge operation, a stand-by operation is executed in which the product gas from the reforming processing unit is circulated in the form of returning to the compressor through a return line, in a state in which a gas supply line from the reforming processing unit to the pressure swing adsorption unit is blocked, the supply of the steam is stopped, and the heating of the reformer by the heating burner is maintained.

That is to say, since, after the purge operation, the stand-by operation is executed in which the product gas from the reforming processing unit is circulated in the form of returning to the compressor through a return line in a state in which a gas supply line from the reforming processing unit to the pressure swing adsorption unit is blocked, the supply of the steam is stopped, and the heating of the reformer by the heating burner is maintained, the reforming processing unit can be maintained in a state in which the product gas producing operation is to be performed or in an increased temperature state that is close to that state, and thus at the start of the product gas producing operation subsequent to the stand-by operation, the state can be rapidly shifted to a state in which the product gas is appropriately produced.

In short, according to the further characteristic configuration of the operation method for the hydrogen production device of the present invention, it is possible to rapidly shift to a state in which a product gas is appropriately produced, at the start of a product gas producing operation.

According to the present invention, a hydrogen production device includes:

a reforming processing unit provided with a compressor for source gas supply for supplying a source gas that contains a hydrogen component, and a reformer for performing steam reforming processing on the source gas in a state in which the reformer is heated to a reforming temperature by a heating burner to obtain a reformed gas that contains a large amount of hydrogen components;

a pressure swing adsorption unit provided with a plurality of adsorption towers configured to perform a pressure swing adsorption operation of adsorbing, using an adsorbent, adsorption target components other than the hydrogen components from the reformed gas to produce a product gas, and discharging the adsorption target components as off-gas;

a product gas tank configured to collect the product gas;

an off-gas supply path configured to supply the off-gas as a burning fuel to the heating burner; and an operation control unit, the operation control unit being configured to execute a product gas producing operation of supplying the source gas and steam to the reformer to produce the reformed gas, and supplying the reformed gas from the reforming processing unit to the adsorption towers to produce the product gas, and the hydrogen production device of the present invention has a characteristic configuration in which when the product gas producing operation is stopped, the operation control unit executes a purge operation in which steam purge processing and product gas purge processing are sequentially performed, the steam purge processing being processing of supplying, instead of the source gas, the product gas from the product gas tank to the reformer using the compressor, and supplying the reformed gas from the reforming processing unit to the plurality of adsorption towers, which perform the pressure swing adsorption operation, while maintaining a state in which the reformer is heated by the heating burner and the steam is supplied to the reformer, and the product gas purge processing being processing of supplying the product gas from the product gas tank to the reformer using the compressor, and supplying the product gas from the reforming processing unit to the plurality of adsorption towers, which perform the pressure swing adsorption operation, in a state in which the supply of the steam is stopped and the heating of the reformer by the heating burner is maintained.

That is to say, the hydrogen production device of the present invention has the same characteristic configuration as the characteristic configuration of the above-described operation method for the hydrogen production device, and thus realizes the same functions and effects as those of the characteristic configuration of the above-described operation method for the hydrogen production device.

That is to say, when the product gas producing operation is stopped, the operation control unit executes, as the purge operation, steam purge processing and product gas purge processing, sequentially.

Also, since in the steam purge processing, gas having a high concentration in hydrogen components that is contained in the reformed gas from the reforming processing unit is collected as a product gas, and gas having a low concentration in hydrogen components (gas having a high concentration in adsorption target components) that is contained in the reformed gas from the reforming processing unit is supplied as off-gas to the heating burner, which heats the reformer, and is used as a burning fuel. This makes it possible to prevent the hydrogen components from being discarded to the outside in the steam purge processing.

Also, since in the product gas purge processing, gas having a high concentration in hydrogen components that is contained in the product gas from the reforming processing unit is collected as a product gas, and gas having a low concentration in hydrogen components (gas having a high concentration in adsorption target components) that is contained in the product gas from the reforming processing unit is supplied as off-gas to the heating burner, which heats the reformer, and is used as a burning fuel. This makes it possible to prevent the hydrogen components from being discarded to the outside in the product gas purge processing.

In short, according to the characteristic configuration of the hydrogen production device of the present invention, it is possible to prevent a large amount of hydrogen components from being discarded to the outside in a purge operation.

In a further characteristic configuration of the hydrogen production device of the present invention, after the purge operation, the operation control unit executes a stand-by operation in which the product gas from the reforming processing unit is circulated in the form of returning to the compressor through a return line, in a state in which a gas supply line from the reforming processing unit to the pressure swing adsorption unit is blocked, the supply of the steam is stopped, and the heating of the reformer by the heating burner is maintained.

That is to say, the further characteristic configuration of the hydrogen production device of the present invention has the same characteristic configuration as the further characteristic configuration of the above-described operation method for the hydrogen production device, and thus realizes the same functions and effects as those of the further characteristic configuration of the above-described operation method for the hydrogen production device.

That is to say, since the stand-by operation is executed after the purge operation, the reforming processing unit can be maintained in a state in which the product gas producing operation is to be performed or in an increased temperature state that is close to that state, and thus at the start of the product gas producing operation subsequent to the stand-by operation, the state can be rapidly shifted to a state in which the product gas is appropriately produced.

In short, according to the further characteristic configuration of the hydrogen production device of the present invention, it is possible to rapidly shift to a state in which a product gas is appropriately produced, at the start of a product gas producing operation.

BRIEF DESCRIPTION OF THE DRAWINGS

FIG. 1 is an overall diagram illustrating a hydrogen production device.

FIG. 2 is a schematic diagram illustrating a pressure swing adsorption unit.

FIG. 3 is a diagram illustrating an operation cycle of the pressure swing adsorption unit.

DETAILED DESCRIPTION OF PREFERRED EMBODIMENTS

Embodiments

Figure 4:
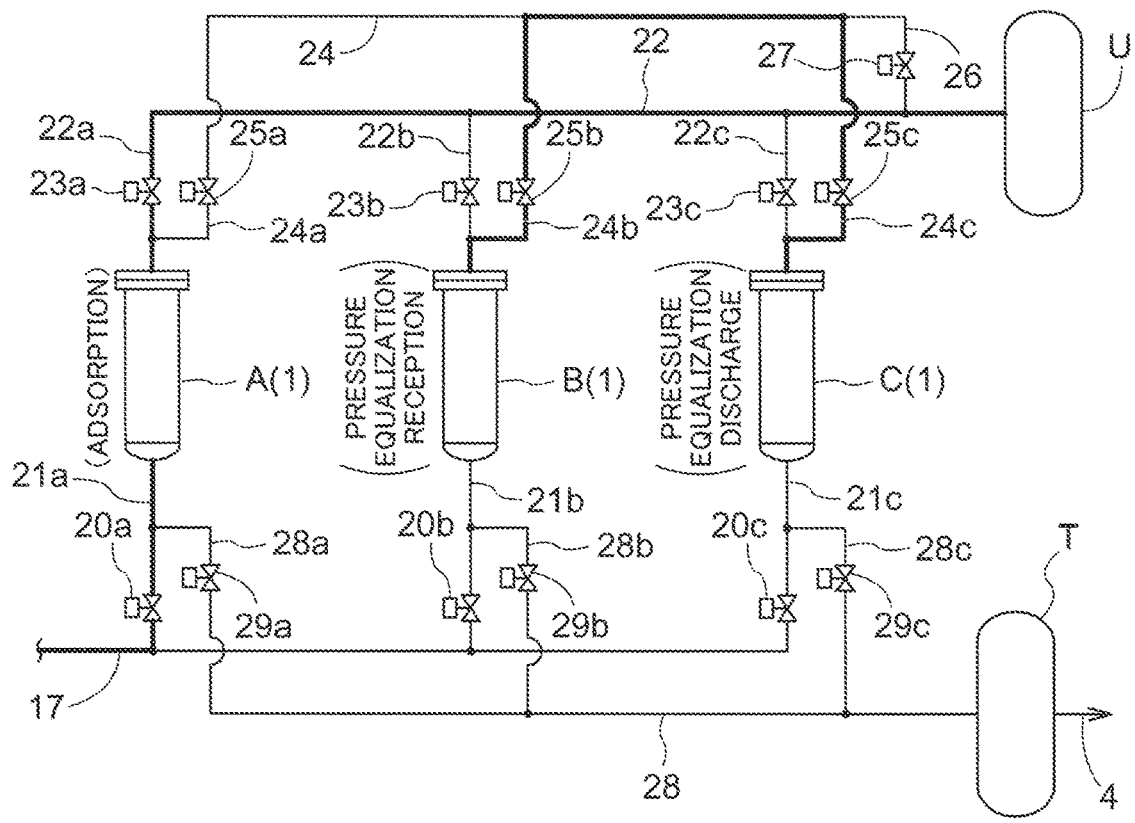
FIG. 4 is a diagram illustrating an operation state of the pressure swing adsorption unit.

The following will describe an embodiment of the present invention with reference to the drawings.

Overall Configuration of Hydrogen Production Device

As shown in FIG. 1, a hydrogen production device includes: a reforming processing unit AK that reforms a source gas G that is a hydrocarbon gas such as natural gas or naphtha into a reformed gas K having a large amount of hydrogen components; a pressure swing adsorption unit BS provided with adsorption towers 1 that adsorb, using an adsorbent, adsorption target components other than the hydrogen components from the reformed gas K supplied from the reforming processing unit AK, and produces a product gas H; a product gas tank U that collects the product gas H produced by the pressure swing adsorption unit BS; an off-gas tank T that collects off-gas that is discharged from the pressure swing adsorption unit BS; and an operation control unit M that controls operations of the reforming processing unit AK and the pressure swing adsorption unit BS.

The source gas G contains, in addition to a hydrogen component, methane, carbon dioxide, carbon monoxide, and nitrogen, and as the adsorption target components other than the hydrogen component, methane, carbon dioxide, carbon monoxide, and nitrogen are adsorbed by the adsorbent of the adsorption towers 1.

Details of Reforming Processing Unit

The reforming processing unit AK includes: a steam mixing unit J that mixes steam with the source gas G; a reforming reaction tube 2 that serves as a reformer for reforming the source gas G into a reformed gas K having a large amount of hydrogen components with steam reforming processing; and a heating burner N that heats the reforming reaction tube 2 to a reforming reaction temperature (e.g., 700° C.).

An off-gas supply path 4 through which off-gas accumulated in the off-gas tank T is supplied to the heating burner N is provided, and an air supply path 5a through which combustion air from an air supply unit 5 such as bellows is supplied to the heating burner N is also provided.

Also, an auxiliary fuel gas path 3 through which a source gas G serving as a fuel gas is supplied to the heating burner N is provided.

Note that the off-gas supply path 4 includes an off-gas on-off valve 4A that opens/closes the off-gas supply path 4, and the auxiliary fuel gas path 3 includes a fuel gas valve 3A that opens/closes the auxiliary fuel gas path 3.

A compressor 7 is provided that delivers the source gas G introduced through a gas introduction line 7A to a desulfurizer 6 via a delivery line 7D, and a mixing unit transport line 9 is provided that transports the source gas G desulfurized by the desulfurizer 6 to a water mixing unit 8.

The water mixing unit 8 is configured to mix water (pure water) supplied from a water supply unit 10 with the desulfurized source gas G.

Note that the gas introduction line 7A is provided with a source gas supply valve Ga that controls supply of the source gas G.

An evaporation transport line 12 for transporting the source gas G into which water is mixed by the water mixing unit 8 toward an evaporation heat exchange unit 11 is provided, so that the water mixed with the source gas G is heated by the evaporation heat exchange unit 11 and is evaporated into steam.

Incidentally, in the present embodiment, the steam mixing unit J includes, as main constituent components, the water mixing unit 8 and the evaporation heat exchange unit 11.

Also, a configuration is adopted in which the source gas G heated by the evaporation heat exchange unit 11 to a state in which the source gas G contains steam (state in which steam is mixed) is transported to the reforming reaction tube 2 through a reaction tube transport line 13, and is reformed into the reformed gas K having a large amount of hydrogen components with steam reforming processing.

That is to say, the reforming reaction tube 2 is filled with a reforming catalyst, and is heated to a reforming reaction temperature (e.g., 700° C.) by the heating burner N as described above, thereby reforming the source gas G into the reformed gas K having a large amount of hydrogen components with the steam reforming processing.

Incidentally, in the present embodiment, after having heated the reforming reaction tube 2, the combustion gas of the heating burner N is configured to flow toward the evaporation heat exchange unit 11 to heat the evaporation heat exchange unit 11, and then is discharged through an exhaust gas path 14.

A transformer transport line 16 that transports the reformed gas K from the reforming reaction tube 2 to a CO transformer 15 is provided, so that carbon monoxide contained in the reformed gas K is transformed into carbon dioxide by the CO transformer 15.

Also, a configuration is adopted in which the reformed gas K transformed by the CO transformer 15 is supplied to the pressure swing adsorption unit BS via a reformed gas supply line 17.

The reformed gas supply line 17 includes a water separator 18 for removing excess moisture from the reformed gas K, and includes a supply control valve 17A at a position of the reformed gas supply line 17 located on the downstream side of the water separator 18.

Also, in order to supply the reformed gas K from which moisture was removed by the water separator 18 as hydrogen gas for use in desulfurizing processing that is performed by the desulfurizer 6, a recycle gas line 19 is provided that guides the reformed gas K flowing through the reformed gas supply line 17 to a position on the upstream side of the compressor 7, that is, to the gas introduction line 7A. The recycle gas line 19 includes a line on/off valve 19A.

Also, a communication line L that connects the product gas tank U and an intermediate position of the recycle gas line 19 is provided. The communication line L includes a communication on/off value La that opens/closes the communication line L, and a communication resistance regulating valve Lb that adjusts the flow path resistance (aperture) of the communication line L.

Note that the communication resistance regulating valve Lb employs a needle valve, for example.

Details of Pressure Swing Adsorption Unit

The pressure swing adsorption unit BS of the present embodiment includes, as the adsorption towers 1, a first adsorption tower A, a second adsorption tower B, and a third adsorption tower C.

As shown in FIG. 2, lower portions of the three adsorption towers 1 are connected to the reformed gas supply line 17 via a first supply branch 21a with a first supply valve 20a, a second supply branch 21b with a second supply valve 20b, and a third supply branch 21c with a third supply valve 20c, respectively.

Each of the adsorption towers 1 is charged and filled with an adsorbent that adsorbs adsorption target components other than the hydrogen components from the reformed gas K.

Note that the adsorption target components other than the hydrogen component refer to carbon dioxide, carbon monoxide, methane, nitrogen, and the like, and carbon monoxide and methane are combustible components.

Upper portions of the three adsorption towers 1 are connected to a product gas discharge line 22 connected to the product gas tank U via a first discharge branch 22a with a first discharge valve 23a, a second discharge branch 22b with a second discharge valve 23b, and a third discharge branch 22c with a third discharge valve 23c, respectively.

As shown in FIG. 1, a product gas release line Q is branched from the product gas discharge line 22, and the product gas release line Q includes a product gas release valve Qa that opens/closes the product gas release line Q, and at a position located on the downstream side of the branch position of the product gas release line Q from the product gas discharge line 22, a product gas valve 22A that opens/closes the product gas discharge line 22 is provided.

Note that in FIG. 2, illustration of the product gas release line Q, the product gas release valve Qa, and the product gas valve 22A is omitted.

As shown in FIG. 2, the upper portions of the three adsorption towers 1 are also connected to a pressure equalization line 24 via a first pressure equalization branch 24a with a first pressure equalization valve 25a, a second pressure equalization branch 24b with a second pressure equalization valve 25b, and a third pressure equalization branch 24c with a third pressure equalization valve 25c.

Also, a washing line 26 is provided that causes the product gas H flowing through the product gas discharge line 22 to flow through the pressure equalization line 24, and the washing line 26 is provided with a washing valve 27.

As shown in FIG. 2, the lower portions of the three adsorption towers 1 are also connected to an off-gas discharge line 28 via a first off-gas branch 28a with a first off-gas valve 29a, a second off-gas branch 28b with a second off-gas valve 29b, and a third off-gas branch 28c with a third off-gas valve 29c, and the off-gas discharge line 28 is connected to the off-gas tank T.

The pressure swing adsorption unit BS has a configuration in which, through the operation control of the operation control unit M, an operation cycle is repeatedly executed, at each of the three adsorption towers 1, with the operation phase varied, the operation cycle including, as shown in FIG. 3, an adsorption process, a pressure equalization discharge process, a pressure reduction process, a washing process, which serves as a regeneration process, a pressure equalization reception process, and a pressure increasing process, thereby producing the product gas H that contains high-purity hydrogen gas components from the reformed gas K.

That is to say, as the operation cycle, a first unit cycle in which the first adsorption tower A performs an adsorption process, a second unit cycle in which the second adsorption tower B performs an adsorption process, and a third unit cycle in which the third adsorption tower C performs an adsorption process are executed in a repeated manner.

The adsorption process is a process of supplying the reformed gas K to an adsorption tower 1 to produce the product gas H.

The pressure equalization discharge process is a process of discharging the internal gas of the adsorption tower 1 for which the adsorption process is complete, as a pressure-equalized gas.

The pressure reduction process is a process of discharging the internal gas of the adsorption tower 1 for which the pressure equalization discharge process is complete to the off-gas discharge line 28.

The washing process is a process of causing the product gas H to flow through the inside of the adsorption tower 1 for which the pressure reduction process is complete, and regenerating the adsorbent in a state in which the adsorption target components are desorbed by the adsorbent, the product gas H that has flown through the adsorption tower 1 being discharged as washing gas to the off-gas discharge line 28.

The pressure equalization reception process is a process of receiving, at the adsorption tower 1 for which the washing process is complete, the pressure-equalized gas discharged in the pressure equalization discharge process.

The pressure increasing process is a process of supplying the product gas H into the adsorption tower 1 for which the pressure equalization reception process is complete so as to increase the pressure.

Since the first unit cycle, the second unit cycle, and the third unit cycle are identical, the first unit cycle will be described as a representative example with reference to FIGS. 4 to 6.

Figure 5:
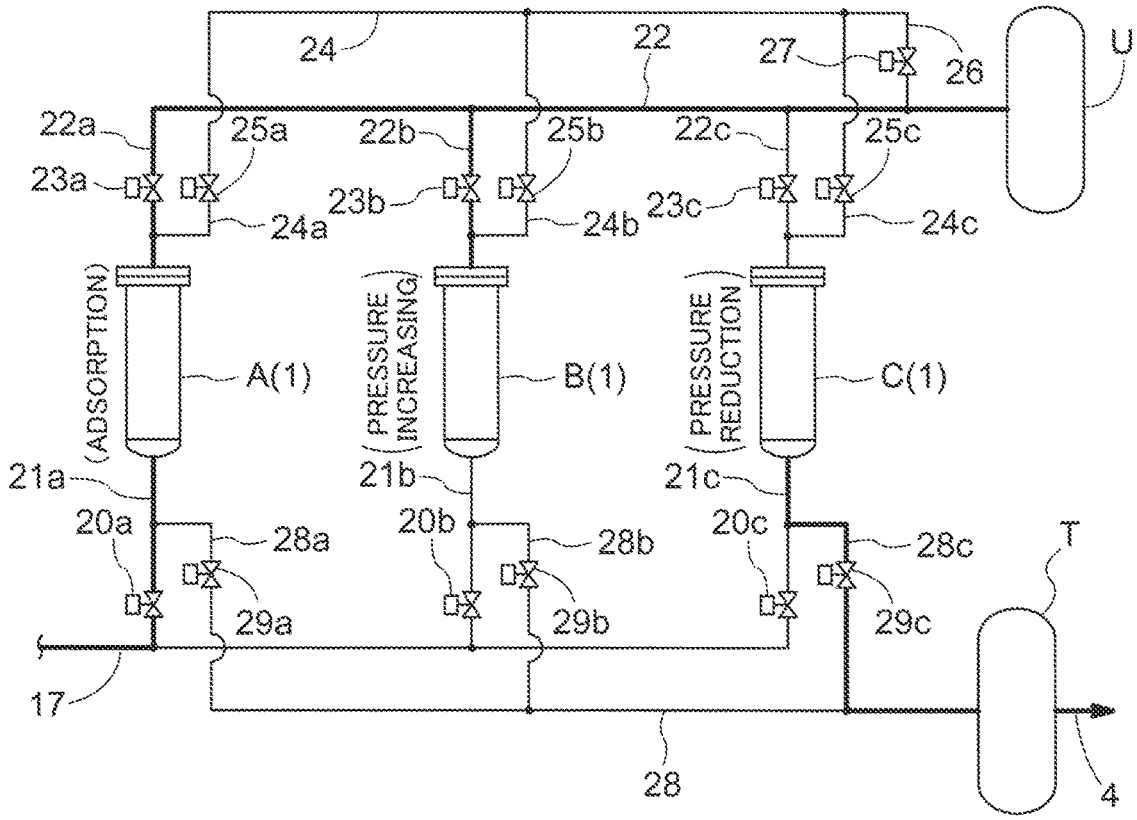
FIG. 5 is a diagram illustrating an operation state of the pressure swing adsorption unit.
Figure 6:
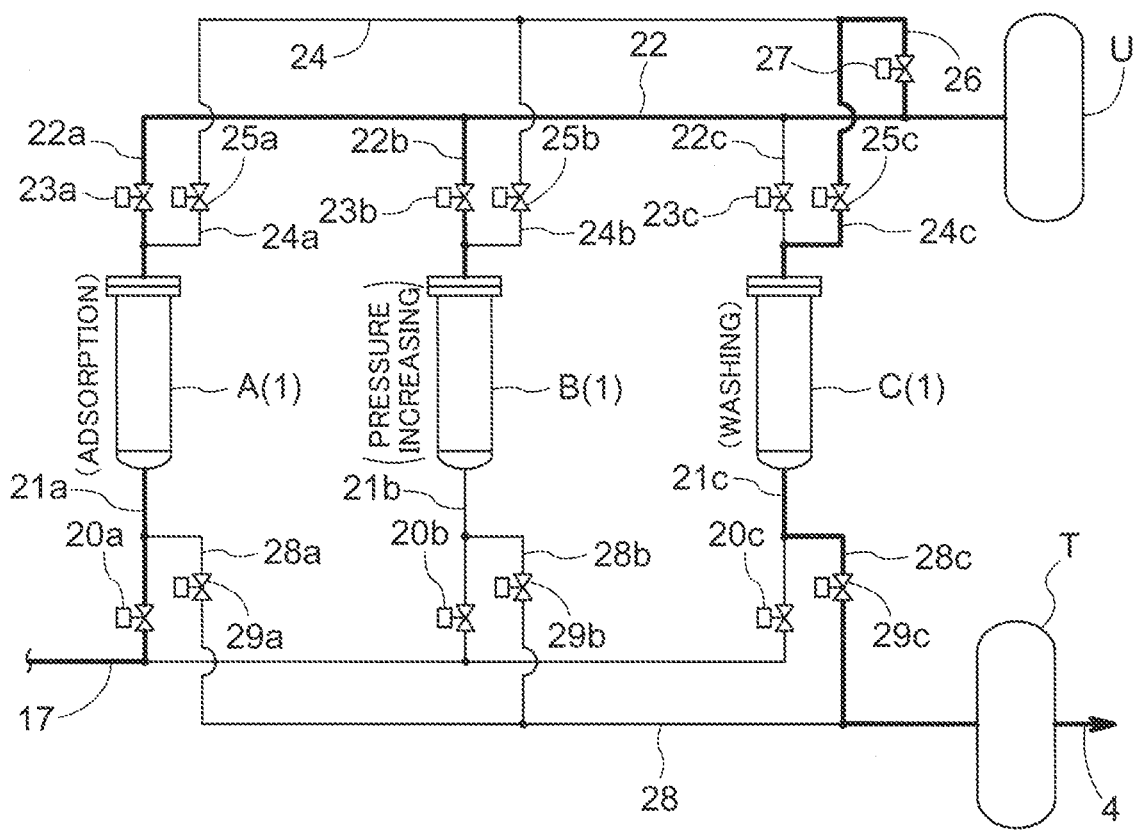
FIG. 6 is a diagram illustrating an operation state of the pressure swing adsorption unit.

Note that in FIGS. 4 to 6, of various types of flow path portions, a flow path portion through which gas actually flows is indicated by bold lines, and a flow path portion through which gas does not flow is indicated by fine lines.

Accordingly, it is clear that valves that correspond to the flow path portions indicated by bold lines are in an open state, and valves that correspond to the flow path portions indicated by fine lines are in a closed state, and thus in the following description, the opening/closing of only representative valves will be described for the open/close state of the valves provided in the flow path portions.

As shown in FIGS. 4 to 6, in the first unit cycle in which the first adsorption tower A performs the adsorption process, the first supply valve 20a and the first discharge valve 23a are open, the adsorption process of adsorbing adsorption target components contained in the reformed gas K is executed, and the product gas H is discharged from the first adsorption tower A to the product gas discharge line 22.

As shown in FIG. 4, in the initial stage of the first unit cycle, by opening the second pressure equalization valve 25b of the second adsorption tower B and the third pressure equalization valve 25c of the third adsorption tower C, the pressure equalization processing of supplying the internal gas of the third adsorption tower C as a pressure-equalized gas to the second adsorption tower B is executed.

The pressure equalization processing corresponds to the pressure equalization discharge process in the third adsorption tower C, and corresponds to the pressure equalization reception process in the second adsorption tower B.

As shown in FIG. 5, in the middle stage of the first unit cycle, by closing the second pressure equalization valve 25b of the second adsorption tower B and opening the second discharge valve 23b of the second adsorption tower B, the pressure increasing process of introducing the product gas H discharged from the first adsorption tower A is executed. This pressure increasing process is also executed in the later stage of the first unit cycle (see FIG. 6).

As shown in FIG. 5, in the middle stage of the first unit cycle, by closing the third pressure equalization valve 25c of the third adsorption tower C and opening the third off-gas valve 29c of the third adsorption tower C, the pressure reduction process of discharging the internal gas of the third adsorption tower C to the off-gas discharge line 28 is executed.

Then, as shown in FIG. 6, in the later stage of the first unit cycle, by opening the third pressure equalization valve 25c and the washing valve 27 while keeping the third off-gas valve 29c open, the washing process of causing the product gas H to flow from the washing line 26 is executed.

Incidentally, the off-gas discharged to the off-gas discharge line 28 in the pressure reduction process and the washing process is collected in the off-gas tank T, and then is supplied to the heating burner N of the reforming processing unit AK through the off-gas supply path 4.

Note that off-gas contains carbon monoxide, methane, and hydrogen, as combustible components.

As described above, the pressure swing adsorption unit BS uses the plurality of (three) adsorption towers 1 to execute the pressure swing adsorption operation of adsorbing, using an adsorbent, adsorption target components other than hydrogen components from a reformed gas K to produce a product gas H, and discharging the adsorption target components as off-gas.

Also, as the pressure swing adsorption operation, an operation is configured to be executed in which an operation cycle is repeatedly executed at each of the adsorption towers 1, with the operation phases of the plurality of adsorption tower 1 varied from each other, the operation cycle including the adsorption process of supplying the reformed gas K to the corresponding adsorption tower 1 to produce the product gas H, the pressure reduction process of discharging the internal gas of the adsorption tower 1, the washing process serving as the regeneration process of regenerating the adsorbent of the adsorption tower 1, and the pressure increasing process of supplying the product gas H to the inside of the adsorption tower 1.

Overview of Operation Control

The operation control unit M executes a product gas producing operation of supplying the source gas G and steam to the reforming reaction tube 2 to produce a reformed gas K, and supplying the reformed gas K from the reforming processing unit AK to the adsorption towers 1 to produce a product gas.

In the product gas producing operation, the reforming reaction tube 2 is heated by the heating burner N, and the pressure swing adsorption unit BS executes the pressure swing adsorption operation.

Also, when the product gas producing operation is stopped, the operation control unit M executes a purge operation in which steam purge processing and product gas purge processing are sequentially performed, and then executes a stand-by operation.

Also, when the stand-by operation is stopped and the product gas producing operation is to be started, the operation control unit M is configured to execute initial operation processing and then start the product gas producing operation.

The following will describe, with reference to FIGS. 7 to 11, the steam purge processing, the product gas purge processing, the stand-by operation, and the initial operation processing, and in FIGS. 7 to 11, a flow path through which gas flows is indicated by bold lines, and a flow path through which gas does not flow is indicated by fine lines. Accordingly, it is clear that valves relating to the flow paths through which gas flows are in an open state, and valves relating to the flow paths through which gas does not flow are in a closed state, and thus only required portions will be used in explanation of the open/close control of the valves.

Details of Steam Purge Processing

Figure 7:
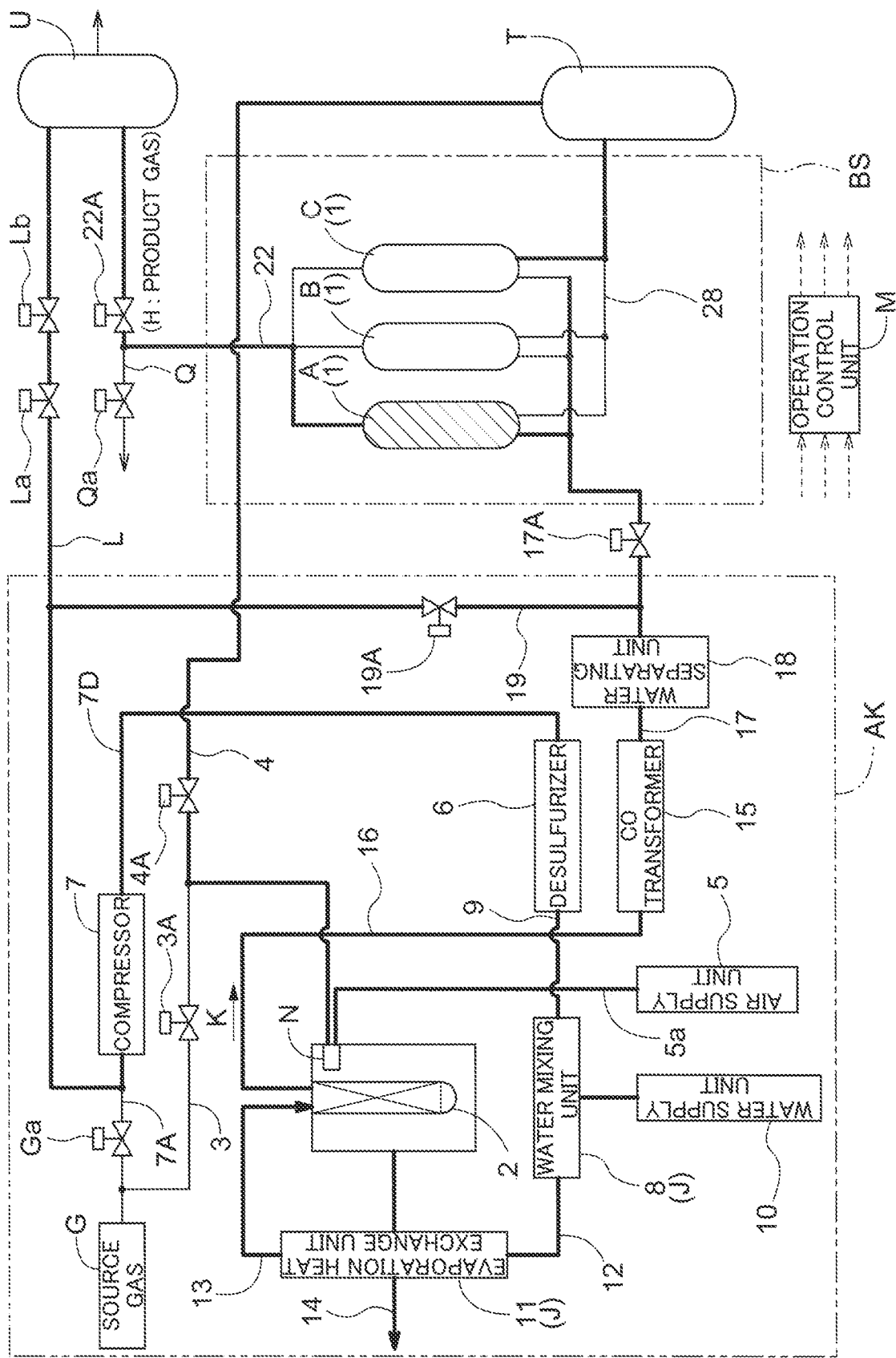
FIG. 7 is a diagram illustrating steam purge processing.

As shown in FIG. 7, the steam purge processing is a process of supplying, instead of the source gas G, the product gas H from the product gas tank U to the reforming reaction tube 2 using the compressor 7, and supplying the reformed gas K from the reforming processing unit AK to the plurality of adsorption towers 1, which perform the pressure swing adsorption operation, while maintaining a state in which the reforming reaction tube 2 is heated by the heating burner N and steam is supplied to the reforming reaction tube 2.

This steam purge processing is continued for about a period of time in which the pressure swing adsorption unit BS performs at least one operation cycle including the first unit cycle, the second unit cycle, and the third unit cycle.

For additional description, when the product gas producing operation is stopped and the steam purge processing is performed, the burning of the heating burner N is maintained, the supply of water (pure water) from the water supply unit 10 is maintained, the supply of steam from the steam mixing unit J is maintained, and the pressure swing adsorption operation of the pressure swing adsorption unit BS is maintained.

Incidentally, off-gas serving as a fuel gas is supplied to the heating burner N, and if the amount of off-gas is lacking, the source gas G will be supplied as a fuel gas by opening the fuel gas valve 3A.

Then, the communication on/off value La is opened in a state in which the source gas supply valve Ga is closed and the supply of the source gas G is stopped, and the product gas from the product gas tank U is caused to flow into the gas introduction line 7A through parts of the communication line L and the recycle gas line 19.

Incidentally, due to the resistance of the communication resistance regulating valve Lb, the pressure of the product gas H that flows through the communication line L is reduced, so that the pressure at the entrance of the compressor 7 is about 0.25 MPaG for example, and the pressure at the exit of the compressor 7 is about 0.75 MPaG for example.

Accordingly, in the steam purge processing, the product gas H is produced by performing the steam reforming processing on the source gas G remaining in the desulfurizer 6, the reforming reaction tube 2, and the like to produce a reformed gas K, supplying the product gas H that contains the produced reformed gas K to the pressure swing adsorption unit BS as in the product gas producing operation, and performing the pressure swing adsorption operation in the plurality of adsorption towers 1.

Note that in FIG. 7, the first adsorption tower A performs the adsorption process, and the third adsorption tower C performs the pressure reduction process.

Details of Product Gas Purge Processing

Figure 8:
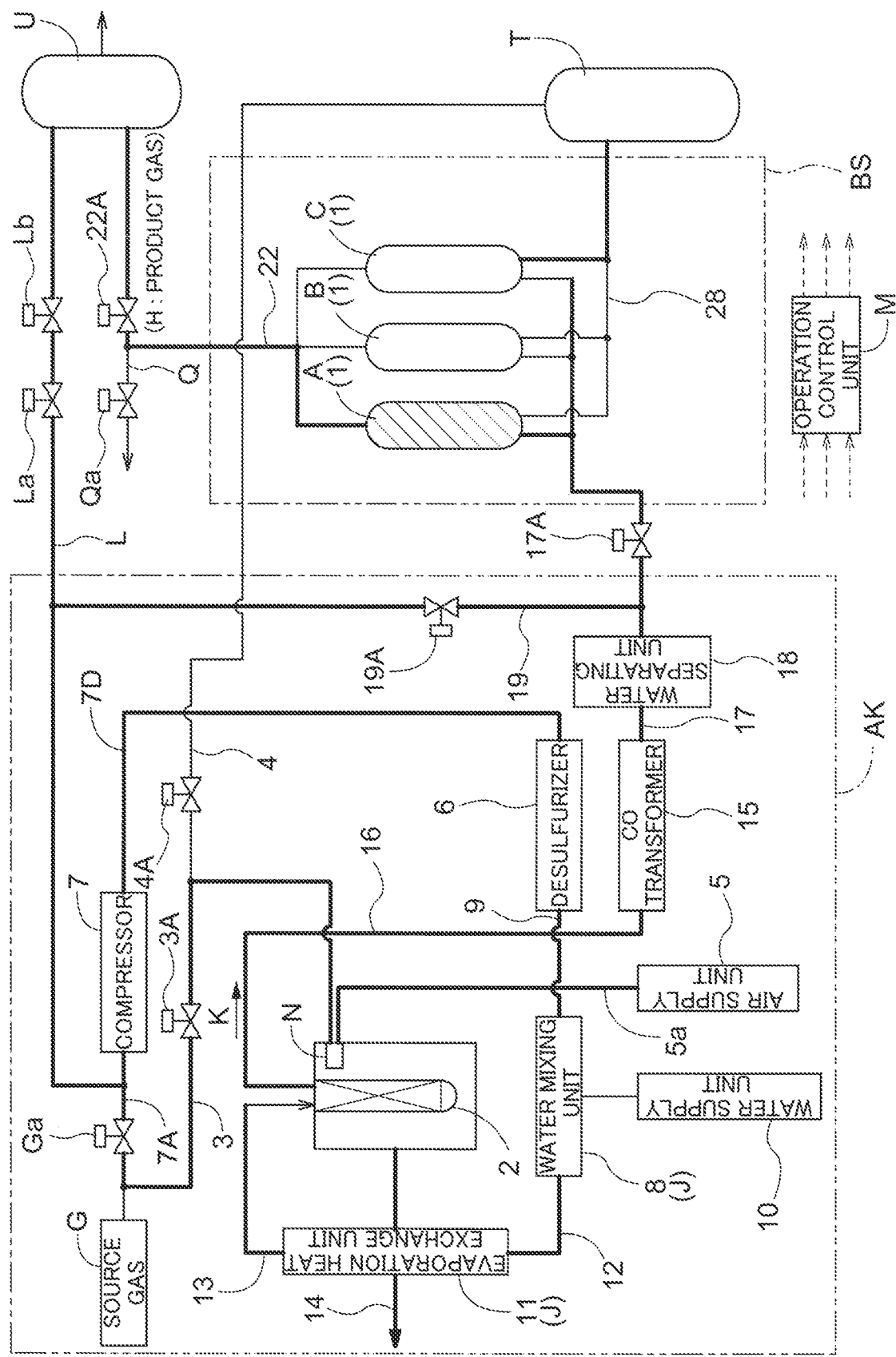
FIG. 8 is a diagram illustrating product gas purge processing.

As shown in FIG. 8, the product gas purge processing is processing of supplying the product gas H from the product gas tank U to the reforming reaction tube 2 using the compressor 7, and supplying the product gas H from the reforming processing unit AK to the adsorption towers 1, in a state in which the supply of the steam is stopped and the heating of the reforming reaction tube 2 by the heating burner N is maintained.

This product gas purge processing is continued for about a period of time in which the pressure swing adsorption unit BS performs at least one or more operation cycle including the first unit cycle, the second unit cycle, and the third unit cycle.

For additional description, when the steam purge processing is stopped and the product gas purge processing is performed, the burning of the heating burner N is maintained, the supply of water (pure water) from the water supply unit 10 is stopped, the supply of steam from the steam mixing unit J is stopped, and the pressure swing adsorption operation of the pressure swing adsorption unit BS is maintained.

Incidentally, the heating burner N is supplied with the source gas G serving as a fuel gas, by opening the fuel gas valve 3A and opening the source gas supply valve Ga.

Then, subsequent to the steam purge processing, the source gas supply valve Ga is closed to stop the supply of the source gas G, and the communication on/off value La is opened to cause the product gas from the product gas tank U to flow into the gas introduction line 7A through parts of the communication line L and the recycle gas line 19.

Incidentally, due to the resistance of the communication resistance regulating valve Lb, the pressure of the product gas H that flows through the communication line L is reduced, so that the pressure at the entrance of the compressor 7 is about 0.25 MPaG for example, and the pressure at the exit of the compressor 7 is about 0.75 MPaG for example.

Accordingly, in the product gas purge processing, the product gas H is produced by causing the product gas H to flow through the desulfurizer 6, the reforming reaction tube 2, the CO transformer 15, and the like, supplying the product gas H from the reforming processing unit AK to the pressure swing adsorption unit BS as in the product gas producing operation, and executing the pressure swing adsorption operation in the plurality of adsorption towers 1.

Note that in FIG. 8, the first adsorption tower A performs the adsorption process, and the third adsorption tower C performs the pressure reduction process.

Then, by executing the product gas purge processing, the reforming processing unit AK is filled with the product gas H, and is maintained in the same high-temperature state as the state in which the reforming processing unit AK executes the steam reforming processing, and as a result of the adsorbent of the plurality of adsorption towers 1 of the pressure swing adsorption unit BS executing the pressure swing adsorption operation on the product gas H, the adsorbent is regenerated in a desorbed state in which the adsorption target components are not adsorbed by the adsorbent.

Details of Stand-by Operation

Figure 9:
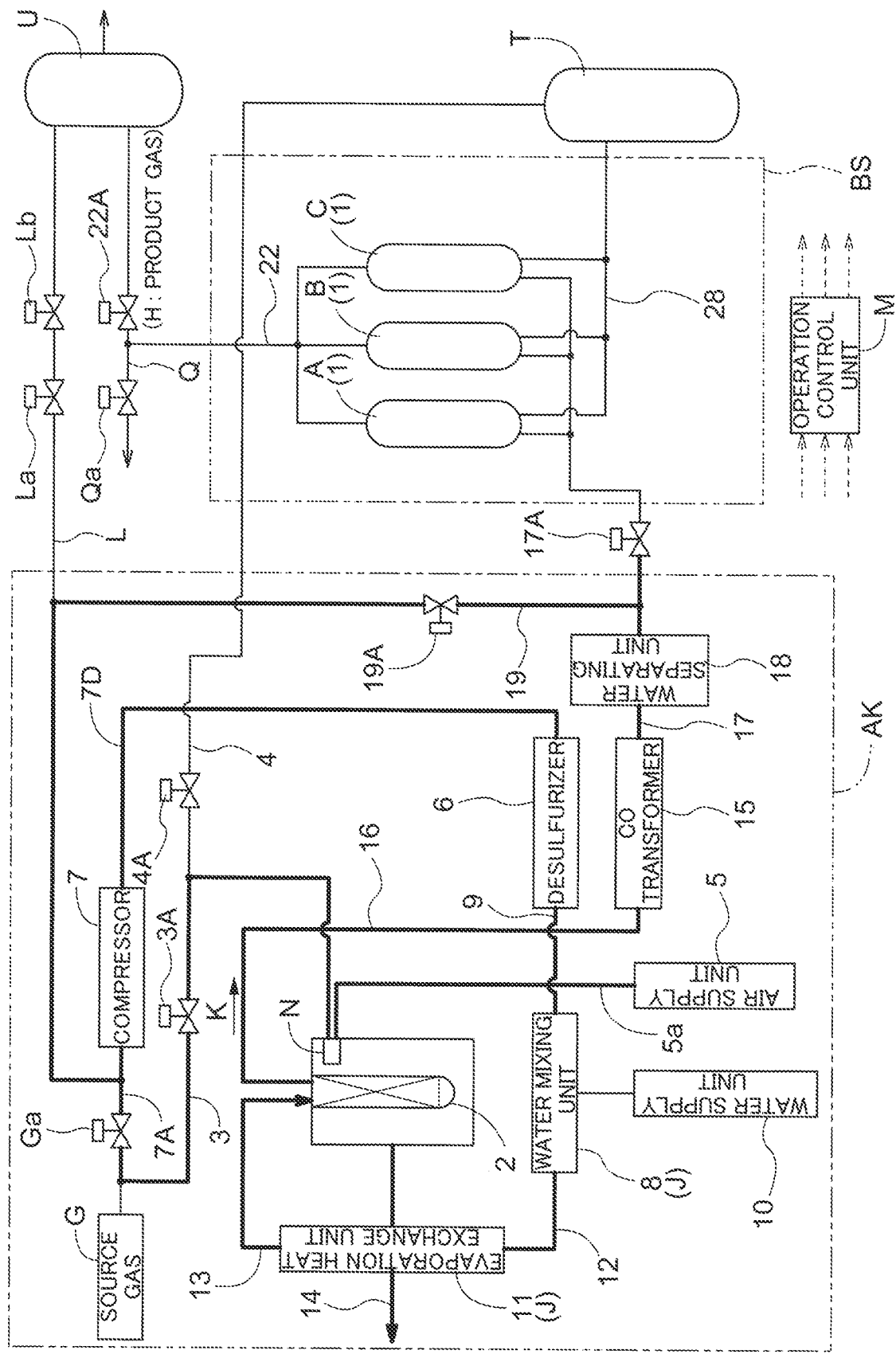
FIG. 9 is a diagram illustrating a stand-by operation.

As shown in FIG. 9, the stand-by operation is an operation in which when the product gas H filling up the reforming processing unit AK is discharged from the reforming processing unit AK, the product gas H is circulated in the form of returning to the compressor 7 through the recycle gas line 19 serving as a return line, in a state in which the reformed gas supply line 17, serving as the gas supply path, extending from the reforming processing unit AK to the pressure swing adsorption unit BS is blocked, and regarding the pressure swing adsorption unit BS, the adsorbent of the adsorption towers 1 is maintained in a state in which the adsorption target components are desorbed by the adsorbent, and regarding the reforming processing unit AK, the supply of the steam is stopped and the heating of the reforming reaction tube 2 by the heating burner N is maintained.

For additional description, when the product gas purge processing is stopped and the stand-by operation is performed, the burning of the heating burner N is maintained, the supply of water (pure water) from the water supply unit 10 is stopped, and the supply of steam from the steam mixing unit J is stopped, the supply control valve 17A of the reformed gas supply line 17 is closed to block the communication between the reformed gas supply line 17 and the three adsorption towers 1.

Incidentally, the heating burner N is supplied with the source gas G serving as a fuel gas, by opening the fuel gas valve 3A and opening the source gas supply valve Ga.

Also, by blocking the communication between the reformed gas supply line 17 and the three adsorption towers 1, the product gas H filling up the reforming processing unit AK is circulated in the state of returning to the compressor 7 through the recycle gas line 19.

Note that in the circulating state, the product gas H filling up the reforming processing unit AK is circulated with a lower flow path resistance than those in the steam purge processing and the product gas purge processing, and thus the pressure at the exit side of the compressor 7 is lower than 0.75 MPaG.

Further, by closing the first supply valve 20a, the second supply valve 20b, and the third supply valve 20c of the pressure swing adsorption unit BS, the pressure swing adsorption operation of the pressure swing adsorption unit BS is stopped.

Also, other valves of the pressure swing adsorption unit BS, namely, the first discharge valve 23a, the second discharge valve 23b, the third discharge valve 23c, the first pressure equalization valve 25a, the second pressure equalization valve 25b, the third pressure equalization valve 25c, the first off-gas valve 29a, the second off-gas valve 29b, and the third off-gas valve 29c are all closed, and the adsorbent of the adsorption towers 1 in the pressure swing adsorption unit BS is maintained in a state in which the adsorption target components are desorbed by the adsorbent.

Accordingly, in the stand-by operation, the product gas H filling up the reforming processing unit AK is circulated while flowing through the desulfurizer 6, the reforming reaction tube 2, the CO transformer 15, and the like, and is maintained in the same high-temperature state as in the state in which the reforming processing unit AK performs steam reforming processing.

Also, in the pressure swing adsorption unit BS, the adsorbent of the adsorption towers 1 is maintained in a state in which the adsorption target components are desorbed by the adsorbent.

Details of Initial Operation Processing

The initial operation processing is processing that is performed when the stand-by operation is stopped and the product gas producing operation is started, and in which immediately after the start, the source gas G and steam are supplied to the reforming reaction tube 2 to produce the reformed gas K, and the reformed gas K from the reforming processing unit AK is supplied to the adsorption towers 1 to produce the product gas H, and if the hydrogen component concentration of the produced product gas H is less than a set value, the product gas H is discarded.

Then, if, by performing the initial operation processing, the hydrogen component concentration of the produced product gas H is greater than or equal to the set value, the operation will shift to the product gas producing operation in which the product gas H is collected in the product gas tank U.

In the present embodiment, a configuration is adopted in which, as the initial operation processing, first, pressure increasing processing of increasing the internal pressure of the reforming processing unit AK and the pressure in the adsorption tower 1 of the pressure swing adsorption unit BS to which the reformed gas K is to be first supplied is executed, and then purification processing of producing the product gas H while executing the pressure swing operation in the pressure swing adsorption unit BS, and discarding the product gas H if the hydrogen component concentration of the produced product gas H is less than a set value is executed.

Figure 10:
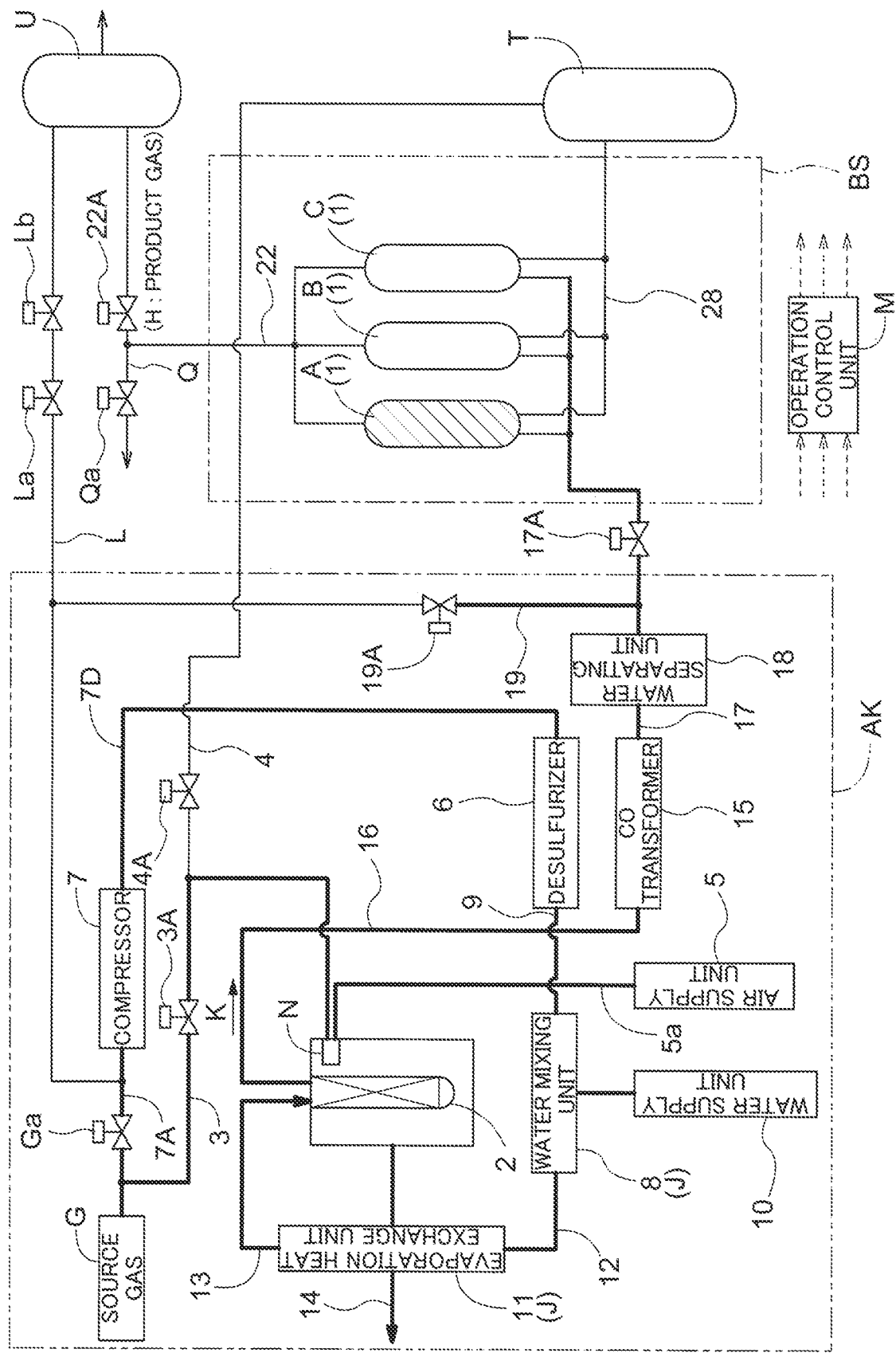
FIG. 10 is a diagram illustrating pressure increasing processing of initial operation processing.

For additional description, when the stand-by operation is stopped and the pressure increasing processing is performed, as shown in FIG. 10, the burning of the heating burner N is maintained, the supply of water (pure water) from the water supply unit 10 is started, and the supply of steam from the steam mixing unit J is started.

Also, the supply control valve 17A of the reformed gas supply line 17 is opened.

Incidentally, the heating burner N is supplied with the source gas G serving as a fuel gas by opening the fuel gas valve 3A.

Also, a configuration is adopted in which although the pressure swing adsorption operation of the pressure swing adsorption unit BS is stopped, regarding the adsorption tower 1, e.g., the first adsorption tower A, of the pressure swing adsorption unit BS to which the reformed gas K is to be first supplied, the first supply valve 20a is opened and the first discharge valve 23a is closed.

Also, the line on/off valve 19A is used to close the recycle gas line 19. Incidentally, by opening the on/off valve 19A halfway for example, instead of closing the recycle gas line 19, it is also possible to increase the flow path resistance of the recycle gas line 19.

Accordingly, since the reformed gas K is produced in the reforming processing unit AK, and the reformed gas K is supplied to the adsorption tower 1, e.g., the first adsorption tower A, of the pressure swing adsorption unit BS to which the reformed gas K is to be first supplied, and the first discharge valve 23a of this first adsorption tower A is closed, the internal pressure of the reforming processing unit AK and the internal pressure of the first adsorption tower A to which the reformed gas K is to be first supplied are increased to a set pressure (for example, 0.75 MPaG).

Figure 11:
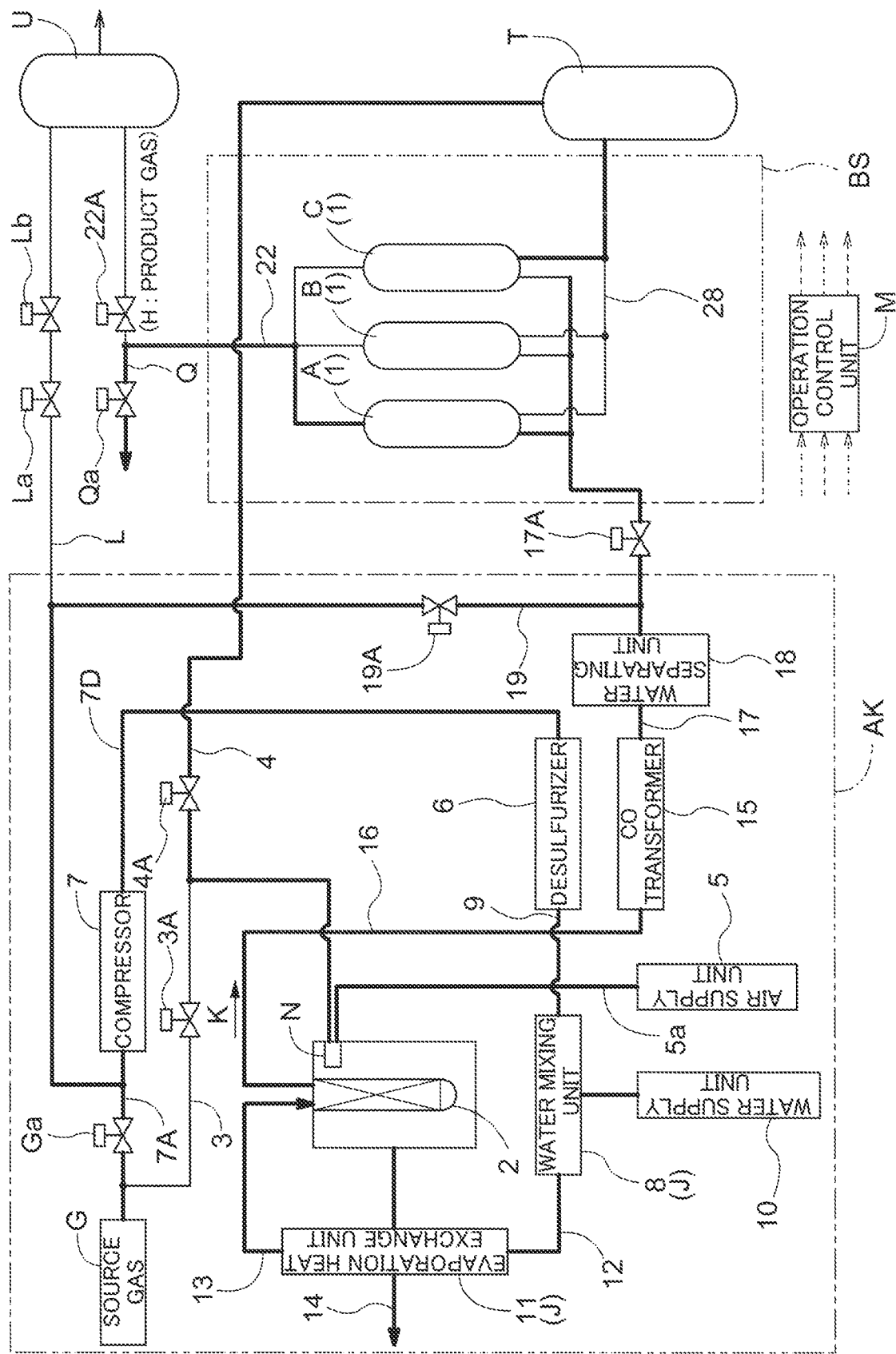
FIG. 11 is a diagram illustrating purification processing of the initial operation processing.

If the internal pressure of the reforming processing unit AK and the internal pressure of the first adsorption tower A to which the reformed gas K is to be first supplied are increased to the set pressure, then the purification processing will be executed, as shown in FIG. 11.

For additional description, when the purification processing is executed, the pressure swing adsorption operation of the pressure swing adsorption unit BS is started with the product gas valve 22A closed and the product gas release valve Qa open.

Also, the line on/off valve 19A is used to open the recycle gas line 19.

Accordingly, when the reformed gas K is supplied from the reforming processing unit AK to the pressure swing adsorption unit BS, the product gas H is produced in the pressure swing adsorption operation, and if the hydrogen component concentration of the produced product gas H is less than a set value, the product gas H will be discarded through the product gas release line Q.

Then, if the hydrogen component concentration of the produced product gas H is greater than or equal to the set value, the operation will shift to the product gas producing operation in which the product gas H is collected in the product gas tank U, by closing the product gas release valve Qa and opening the product gas valve 22A.

The present embodiment has a configuration in which in the initial operation processing, the amount of supply of the source gas G to be supplied by the compressor 7 is set to 40% of the maximum amount of supply in the product gas producing operation, and moreover the time of the operation cycle associated with the amount of supply of the source gas G to be supplied by the compressor 7 is reduced by about 20% less than the time of the product gas producing operation, for example.

Incidentally, although illustration is omitted, a pressure sensor for detecting the internal pressure of the adsorption towers 1 may be provided, and the pressure sensor is configured to detect, in the pressure increasing processing, whether or not the internal pressure of the adsorption towers 1 is increased to a set pressure (for example, 0.75 MPaG).

Also, a concentration sensor for detecting the hydrogen component concentration of the product gas H is provided at a position located on the upstream side of the branch position of the product gas discharge line 22 into the product gas release line Q, and is configured to detect, in the purification processing, whether or not the hydrogen component concentration of the product gas H is greater than or equal to a set value.

Furthermore, a temperature sensor for detecting the temperature of a reforming catalyst is provided inside the reforming reaction tube 2, and the amount of burning of the heating burner N is controlled so that the detected temperature is equal to a reforming reaction temperature (for example, 700° C.).

That is to say, by controlling the amount of supply of off-gas serving as a fuel gas to be supplied through the off-gas supply path 4 and the amount of supply of source gas G serving as a fuel gas to be supplied through the auxiliary fuel gas path 3, the amount of burning of the heating burner N is controlled, and the amount of air to be supplied through the air supply path 5a is adjusted according to the amount of supply of the fuel gas.

Comparison Between Present Invention and Conventional Configuration

When comparing the configuration of the present invention according to the above-described embodiment, with a conventional configuration below, the configuration of the present invention can realize a reduction in the amount of the source gas G and the amount of the product gas H that are consumed in the stopping operation and the activating operation.

That is to say, the conventional configuration is as follows.

When the product gas producing operation is stopped, a purge operation is executed in which steam purge processing and product gas purge processing are sequentially performed in a state in which the reformed gas supply line 17 from the reforming processing unit AK to the pressure swing adsorption unit BS is blocked. The steam purge processing is processing of first supplying, instead of the source gas G, the product gas H from the product gas tank U to the reforming reaction tube 2 through the desulfurizer 6 using the compressor 7, and discarding the reformed gas K from the reforming processing unit AK to the outside, while maintaining a state in which the reforming reaction tube 2 is heated by the heating burner N and steam is supplied to the reforming reaction tube 2. The product gas purge processing is processing of supplying the product gas H from the product gas tank U to the reforming reaction tube 2 through the desulfurizer 6 using the compressor 7, and discarding the product gas from the reforming processing unit AK to the outside, in a state in which the supply of the steam is stopped and the heating of the reforming reaction tube 2 by the heating burner N is maintained.

Then, the stand-by operation is performed in which the product gas H filling up the reforming processing unit AK is circulated in the form of returning to the compressor 7 through the recycle gas line 19, in a state in which the reformed gas supply line 17 from the reforming processing unit AK to the pressure swing adsorption unit BS is blocked, and regarding the pressure swing adsorption unit BS, the adsorbent of the adsorption towers 1 is maintained with the adsorption target components desorbed, and regarding the reforming processing unit AK, the supply of the steam is stopped and the heating of the reforming reaction tube 2 by the heating burner N is maintained.

At an activation operation when the stand-by operation is stopped and the product gas producing operation is started, pressure increasing processing is executed in which the compressor 7 supplies the product gas H from the product gas tank U to increase the pressure. After the completion of the pressure increasing processing, material introduction processing is executed in which the compressor 7 supplies, instead of the product gas H, the source gas G. When the reformed gas K is appropriately produced by this material introduction processing, the product gas producing operation is performed in which supply of the reformed gas to the pressure swing adsorption unit BS is started to produce the product gas by a pressure swing adsorption operation, and if the hydrogen component concentration of the produced product gas is less than a set value, the purification processing of discarding the produced product gas will be executed, and if the hydrogen component concentration of the produced product gas is greater than or equal to the set value, the product gas producing operation in which the product gas H is collected in the product gas tank U will be executed.

At the stopping operation, in the conventional configuration, the source gas G of, e.g., 7 $Nm^3$ is consumed and the product gas H of, e.g., 21 $Nm^3$ is consumed, whereas in the configuration of the present invention, the amount of consumption of the source gas G is zero, and the product gas H of, e.g., 3 $Nm^3$ is consumed, making it possible to realize a reduction in amounts of consumption of the source gas G and the product gas H.

At the activation operation, in the conventional configuration, the source gas G of, e.g., 18 $Nm^3$ is consumed and the product gas H of, e.g., 19 $Nm^3$ is consumed, whereas in the configuration of the present invention, the source gas G of, e.g., 13 $Nm^3$ is consumed, and the amount of consumption of the product gas H is zero, making it possible to realize a reduction in amounts of consumption of the source gas G and the product gas H.

Other Embodiments

In the following, other embodiments are listed and described.

(1) Although in the above-described embodiment, the pressure swing adsorption unit BS provided with three adsorption towers 1 is taken as an example, the present invention is also applicable to a configuration in which a pressure swing adsorption unit BS is provided with two or four or more adsorption towers 1.

(2) Although in the above-described embodiment, the pressure swing adsorption unit BS configured to perform the washing process as a regeneration process is taken as an example, the present invention is also applicable to a configuration in which the pressure swing adsorption unit BS performs, instead of the washing process, a suction process of suctioning the inside of the adsorption towers 1 using a vacuum pump as a regeneration process.

(3) Although in the above-described embodiment, a configuration is exemplified in which the steam mixing unit J mixes water with the source gas G and then the evaporation heat exchange unit 11 evaporate the mixed water, the present invention may also be applicable to a configuration in which the steam mixing unit J mixes steam generated in advance with the source gas G.

(4) Although in the above-described embodiment, a case is exemplified in which in the pressure increasing processing in the initial operation processing, the pressure is increased only using the reformed gas K from the reforming processing unit AK, various change may be made in the specific configuration of the initial operation, such as a configuration in which the pressure is increased while supplying the product gas H to the adsorption tower 1 to which the reformed gas K is to be first supplied.

(5) Although in the above-described embodiment, the reformed gas supply line 17 includes the supply control valve 17A, a configuration is also possible in which the supply control valve 17A is omitted, by closing the first supply valve 20a, the second supply valve 20b, and the third supply valve 20c of the pressure swing adsorption unit BS, so as to open and close the communication between the reformed gas supply line 17 and the adsorption towers 1.

It should be noted that the configurations disclosed in the above-described embodiments (including the other embodiments, the same applies below) can be applied in combination with configurations disclosed in other embodiments so long as no contradiction is incurred, the embodiments disclosed in the present specification are mere examples, and embodiments of the present invention are not limited to those disclosed in the present specification and can be modified as appropriate without departing from the object of the present invention.

DESCRIPTION OF REFERENCE SIGNS

1: Adsorption towers
2: Reformer
4: Off-gas supply path
7: Compressor
17: Gas supply path
19: Return line
A: Reforming processing unit
B: Pressure swing adsorption unit
G: Source gas
H: Product gas
K: Reformed gas
M: Operation control unit
N: Heating burner
U: Product gas tank

The invention claimed is:

1. An operation method for a hydrogen production device, wherein the hydrogen production device comprises:

a reforming processing unit provided with a compressor for source gas supply for supplying a source gas that contains a hydrogen component, and a reformer for performing steam reforming processing on the source gas in a state in which the reformer is heated to a reforming temperature by a heating burner to obtain a reformed gas that contains a large amount of hydrogen components;

a pressure swing adsorption unit provided with a plurality of adsorption towers configured to perform a pressure swing adsorption operation of adsorbing, using an adsorbent, adsorption target components other than the hydrogen components from the reformed gas to produce a product gas, and discharging the adsorption target components as off-gas;

a product gas tank configured to collect the product gas; and an off-gas supply path configured to supply the off-gas as a burning fuel to the heating burner, the operation method comprising:

executing a product gas producing operation by supplying the source gas and steam to the reformer to produce the reformed gas;

supplying the reformed gas from the reforming processing unit to the adsorption towers to produce the product gas; and when the product gas producing operation is stopped, executing a purge operation in which steam purge processing and product gas purge processing are sequentially performed, wherein the steam purge processing is processing of supplying, instead of the source gas, the product gas from the product gas tank to the reformer using the compressor, and supplying the reformed gas from the reforming processing unit to the plurality of adsorption towers, which perform the pressure swing adsorption operation, while maintaining a state in which the reformer is heated by the heating burner and the steam is supplied to the reformer, and wherein the product gas purge processing is processing of supplying the product gas from the product gas tank to the reformer using the compressor, and supplying the product gas from the reforming processing unit to the plurality of adsorption towers, which perform the pressure swing adsorption operation, in a state in which the supply of the steam is stopped and the heating of the reformer by the heating burner is maintained.

2. The operation method for the hydrogen production device according to claim 1, wherein after the purge operation, a stand-by operation is executed in which the product gas from the reforming processing unit is circulated in the form of returning to the compressor through a return line, in a state in which a gas supply line from the reforming processing unit to the pressure swing adsorption unit is blocked, the supply of the steam is stopped, and the heating of the reformer by the heating burner is maintained.

3. A hydrogen production device comprising:

a reforming processing unit provided with a compressor for source gas supply for supplying a source gas that contains a hydrogen component, and a reformer for performing steam reforming processing on the source gas in a state in which the reformer is heated to a reforming temperature by a heating burner to obtain a reformed gas that contains a large amount of hydrogen components;

a pressure swing adsorption unit provided with a plurality of adsorption towers configured to perform a pressure swing adsorption operation of adsorbing, using an adsorbent, adsorption target components other than the hydrogen components from the reformed gas to produce a product gas, and discharging the adsorption target components as off-gas;

a product gas tank configured to collect the product gas;

an off-gas supply path configured to supply the off-gas as a burning fuel to the heating burner; and an operation control unit, wherein the operation control unit is configured to execute a product gas producing operation of supplying the source gas and steam to the reformer to produce the reformed gas, and supplying the reformed gas from the reforming processing unit to the adsorption towers to produce the product gas, wherein when the product gas producing operation is stopped, the operation control unit executes a purge operation in which steam purge processing and product gas purge processing are sequentially performed, the steam purge processing is processing of supplying, instead of the source gas, the product gas from the product gas tank to the reformer using the compressor, and supplying the reformed gas from the reforming processing unit to the plurality of adsorption towers, which perform the pressure swing adsorption operation, while maintaining a state in which the reformer is heated by the heating burner and the steam is supplied to the reformer, and the product gas purge processing is processing of supplying the product gas from the product gas tank to the reformer using the compressor, and supplying the product gas from the reforming processing unit to the plurality of adsorption towers, which perform the pressure swing adsorption operation, in a state in which the supply of the steam is stopped and the heating of the reformer by the heating burner is maintained.

4. The hydrogen production device according to claim 3, wherein after the purge operation, the operation control unit executes a stand-by operation in which the product gas from the reforming processing unit is circulated in the form of returning to the compressor through a return line, in a state in which a gas supply line from the reforming processing unit to the pressure swing adsorption unit is blocked, the supply of the steam is stopped, and the heating of the reformer by the heating burner is maintained.

* * * * *